United States Patent
Hamilton (10) Patent No.: US 7,461,556 B2
(45) Date of Patent: Dec. 9, 2008

(54) TEST SYSTEM FOR DYNAMICALLY ANALYZING A VEHICLE UNDER SIMULATED ROAD CONDITIONS

(75) Inventor: James Hamilton, Indianapolis, IN (US)

(73) Assignee: Chip Ganassi Racing Teams, Inc., Indianapolis, IN (US)

( * ) Notice: Subject to any disclaimer, the term of this patent is extended or adjusted under 35 U.S.C. 154(b) by 75 days.

(21) Appl. No.: 11/555,735

(22) Filed: Nov. 2, 2006

(65) Prior Publication Data

US 2007/0261499 A1 Nov. 15, 2007

Related U.S. Application Data (60) Provisional application No. 60/733,103, filed on Nov. 3, 2005.

(51) Int. Cl.
*G01M 17/04* (2006.01)

(52) U.S. Cl. ............................. 73/669; 73/117.03

(58) Field of Classification Search ............... 73/669, 73/116.01, 117.01, 117.02, 117.03, 118.01, 73/670
See application file for complete search history.

(56) References Cited

U.S. PATENT DOCUMENTS

| | | | | |
|---|---|---|---|---|
| 3,827,289 A | * | 8/1974 | Borg | 73/669 |
| 4,263,809 A | * | 4/1981 | Petersen et al. | 73/798 |
| 4,658,656 A | * | 4/1987 | Haeg | 73/669 |
| 4,689,998 A | * | 9/1987 | Jackson et al. | 73/669 |
| 4,733,558 A | * | 3/1988 | Grenier | 73/118.1 |
| 4,768,374 A | * | 9/1988 | Fouchey | 73/118.1 |
| 4,981,034 A | * | 1/1991 | Haeg | 73/118.1 |
| 5,465,615 A | * | 11/1995 | Petersen et al. | 73/118.1 |
| 5,487,301 A | | 1/1996 | Müller et al. | |
| 5,533,403 A | * | 7/1996 | Haeg et al. | 73/669 |
| 5,610,330 A | * | 3/1997 | Fricke et al. | 73/146 |
| 5,633,464 A | * | 5/1997 | Haeg et al. | 73/669 |
| 5,777,243 A | | 7/1998 | Kewish | |
| 6,257,055 B1 | * | 7/2001 | Haeg et al. | 73/118.1 |
| 6,640,638 B1 | * | 11/2003 | Haeg et al. | 73/669 |
| 6,779,391 B2 | | 8/2004 | Bösl | |
| 7,058,488 B2 | * | 6/2006 | Kemp et al. | 701/33 |
| 7,146,859 B2 | * | 12/2006 | Dittmann et al. | 73/669 |
| 2002/0083762 A1 | | 7/2002 | Coe et al. | |
| 2004/0060350 A1 | * | 4/2004 | Boeck et al. | 73/122 |
| 2005/0022587 A1 | | 2/2005 | Tentrup et al. | |
| 2006/0059993 A1 | * | 3/2006 | Temkin et al. | 73/669 |

OTHER PUBLICATIONS

Higgins, Amy: "One step ahead: The quest for an edge is a constant part of NASCAR's ultracompetitive Winston Cup circuit," Machine Design, vol. 75; Part 3, pp. 36-40, Feb. 6, 2003.

(Continued)

*Primary Examiner*—Eric S McCall
(74) *Attorney, Agent, or Firm*—Bose McKinney & Evans LLP (57) ABSTRACT

An apparatus for testing a vehicle. The apparatus includes an actuator and a stand assembly supported by the actuator. The stand assembly includes a coupling device configured to attach to a vehicle, and the actuator is configured to move the vehicle in response to a computer-generated signal.

50 Claims, 7 Drawing Sheets

OTHER PUBLICATIONS

Kren, Lawrence: "Going into Shocks: They have been called the "last frontier" in the increasingly regulated sport of NASCAR racing. What's all the fuss about? Shock absorbers," Machine Design, vol. 77; Part 3, pp. 49-52, Feb. 3, 2005.

"Chevy Shakes Up IRL Chassis Development," Richmond Va., Jun. 26, 2002, from website http://www.theautochannel.com/news/2002/06/27/142751.html, 2 pages.

Haney, Paul: "A Test Using the Shaker Rig," Inside Racing Technology online publication—http://www.insideracingtechnology.com/oshkrtest.htm, Jun. 25, 2001, 4 pages.

Haney, Paul: "Shaker Test Data," Inside Racing Technology online publication—http://www.insideracingtechnology.com/oshkrdata.htm, Jul. 4, 2001, 6 pages.

Haney, Paul: "Shaker Rig Q & A," Inside Racing Technology online publication—http://www.insideracingtechnology.com/oshkrq&a.htm, Jul. 30, 2001, 3 pages.

Haney, Paul: "Ohlins 7-Post Shaker," Inside Racing Technology online Publication—http://www.insideracingtechnology.com/o7postshkr.htm, Jun. 15, 2001, 4 pages.

Miller, Andrew: "Testing a Formula SAE Racecar on a Seven-Poster Vehicle Dynamics Simulator," Proceedings of the 2002 SAE Motorsports Engineering Conference and Exhibition, Dec. 2002, Issue 382, 8 pages.

Satchell, Terry: "Shaken, Not Stirred," Circle Track, available at http://www.circletrack.com/techarticles/seven_post_shaker_rig_suspension_dynamics/, Dec. 1, 2001, 2 pages.

Model 320 Tire Coupled Road Simulator Brochure available from MTS Systems Corporation, Eden Prairie, MN, dated 2002, 20 pages.

Wright, Peter: "Movers and Shakers," GrandPrix.com website—available at http://www.grandprix.com/ft/ftpw006.html, Oct. 19, 2000, 5 pages.

* cited by examiner

TEST SYSTEM FOR DYNAMICALLY ANALYZING A VEHICLE UNDER SIMULATED ROAD CONDITIONS

RELATED APPLICATIONS

This application claims priority to U.S. Provisional Patent Application Ser. No. 60/733,103, filed Nov. 3, 2005, the disclosure of which is expressly incorporated by reference herein.

BACKGROUND

The present teachings relate to a vehicle testing system and more particularly to a system for testing a vehicle with a spring stand apparatus.

Vehicle testing systems, such as four-post and seven-post vehicle dynamic simulators and/or shaker rig assemblies are often used by those in the automobile racing industry to measure and test a vehicle's response to simulated road and/or track conditions. For instance, a four-post rig test can move each of a vehicle's four tires/wheels up and down via hydraulic actuators to simulate the bumps of a racetrack. Moreover, a seven-post rig test utilizes three additional actuators to pull and push on a vehicle's frame to simulate banking, aerodynamics, turning, braking and accelerating loads.

When undergoing such conventional testing procedures, tires behave somewhat like vertical springs and exhibit very little damping effect as they roll. When not rolling, however, tires have higher damping values. This inconsistent behavior makes it difficult to measure and accurately analyze a vehicle's true performance during a dynamic testing procedure. Moreover, the vertical stiffness and damping of the tires changes unfavorably with use and with temperature. Accordingly, it would be desirable to overcome these and other shortcomings of the prior art.

SUMMARY OF THE INVENTION

In one exemplary embodiment, the present teachings provide an apparatus for testing a vehicle. According to this exemplary embodiment, the apparatus includes an actuator and a stand assembly supported by the actuator. The stand assembly includes a coupling device configured to attach to a vehicle, and the actuator is configured to move the vehicle in response to a computer-generated signal.

According to another exemplary embodiment, a vehicle testing apparatus having a base, a pivot arm, a biasing member and a coupling device is provided. The pivot arm is pivotably coupled to the base and is configured to move from a first position to a second position relative to a pivot axis of the base. When located in the first position, the pivot arm is substantially parallel to a transverse axis of the base. The biasing member is releasably coupled to the pivot arm and is configured to support the pivot arm when in the first position. The coupling device is configured to attach to a vehicle and is suspended from the pivot arm in such a manner that movement of the vehicle is allowed.

According to yet another exemplary embodiment, a vehicle testing apparatus having an actuator, a stand assembly and a controller coupled to the actuator is provided. The stand assembly is supported by the actuator and comprises a coupling device that is configured to attach to the vehicle. The controller includes an output and is configured to generate a signal to the actuator to cause the vehicle to move in response thereto.

In yet another exemplary embodiment, a method for testing a vehicle is provided. The method comprises providing an actuator, generating a signal to the actuator to cause the vehicle to move through a displacement pattern, and evaluating the movement of the vehicle. According to this exemplary embodiment, the actuator is configured to support a stand assembly attached to the vehicle, and the movement of the vehicle is evaluated by analyzing the displacement of the actuator.

BRIEF DESCRIPTION OF THE DRAWINGS

The above-mentioned aspects of the present teachings and the manner of obtaining them will become more apparent and the invention itself will be better understood by reference to the following description of the embodiments of the invention taken in conjunction with the accompanying drawings, wherein.

Corresponding reference characters indicate corresponding parts throughout the several views.

DETAILED DESCRIPTION

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

The present teachings are directed to dynamic vehicle simulators, and particularly shaker rig assemblies for testing vehicle performance. As is known within the art, shaker rig assemblies include a plurality of hydraulic actuators that are able to provide road-simulating effects to vehicles being analyzed, as well as to simulate banking, cornering and aerodynamic loads typically felt by a vehicle when operating on a racetrack. Such rig assemblies are usually tested under controlled conditions and are driven by computer systems configured to actuate hydraulic plungers and rams connected to the vehicle. Typically, the vehicle undergoing analysis rests on four or more actuators. These actuators are designed to simulate a variety of road inputs, as well as simulate aerodynamic down-forces produced by the vehicle's wings and/or by ground effects. Moreover, the actuators are also designed to simulate suspension loads produced by the vehicle when banking, as well as provide a means to roll the vehicle to evaluate cornering performance.

The present teachings enhance the above-described testing processes by using a spring stand assembly to dynamically analyze a vehicle. The present teachings allow the testing process to be conducted by connecting the vehicle frame directly to the spring stand assembly. Because the vehicle is attached directly to the testing assembly, the use of wheels and/or tires is not required like many conventional procedures. More particularly, conventional shaker rig assemblies utilize a vehicle's wheels and/or tires to perform the vehicle analysis. However, tires behave somewhat like vertical springs when rolling and have different damping values than non-rolling (static) tires. As such, it is difficult to accurately analyze a vehicle's true behavior in response to these simulated conditions, particularly as static and non-static tires exhibit differing damping values. As these teachings do not require the use of such wheels or tires, the problems associated with the damping inconsistencies are reduced and better test results can be achieved.

Figure 2:
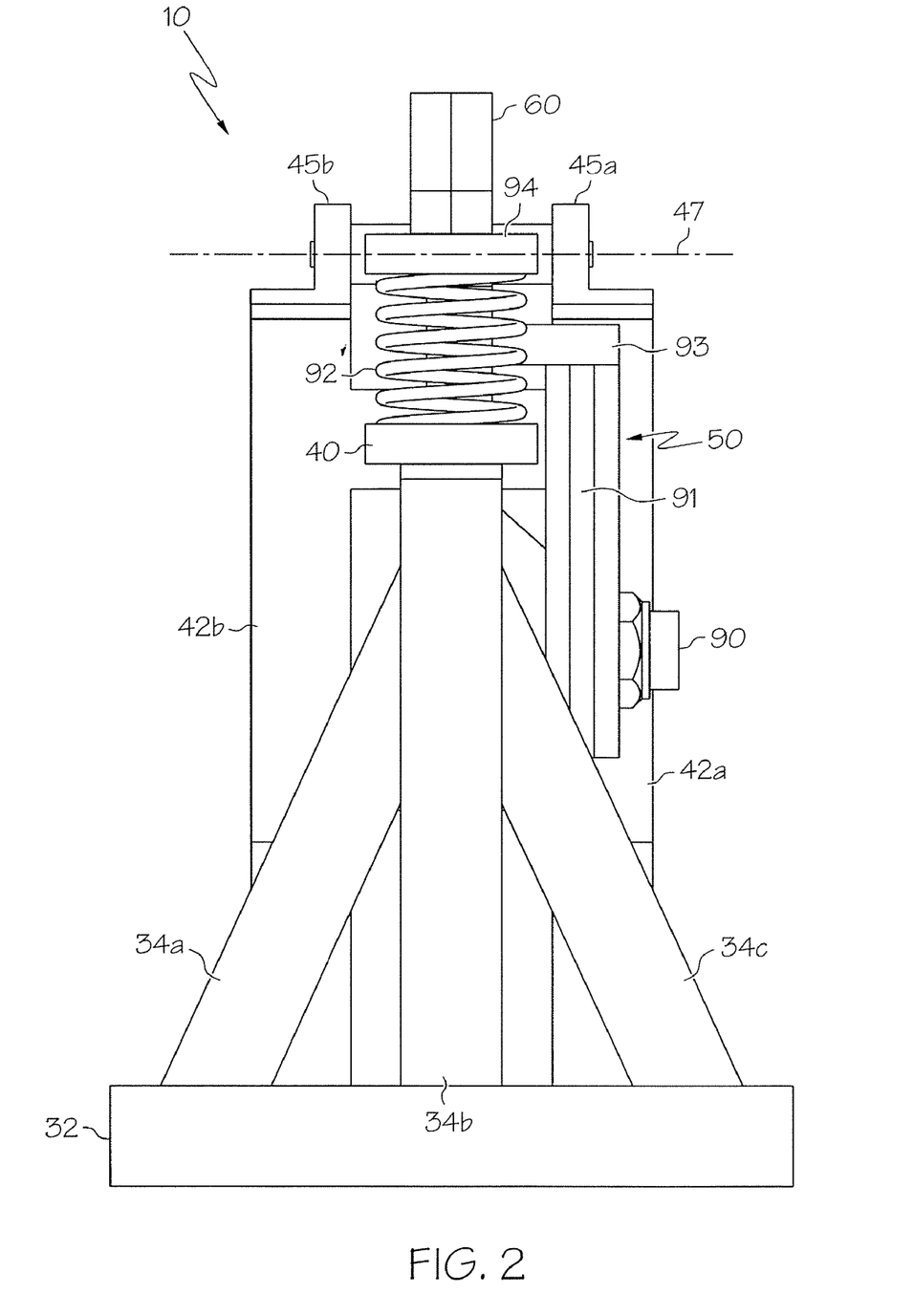
FIG. 2 is a side view of the exemplary spring stand assembly of FIG. 1.
Figure 3:
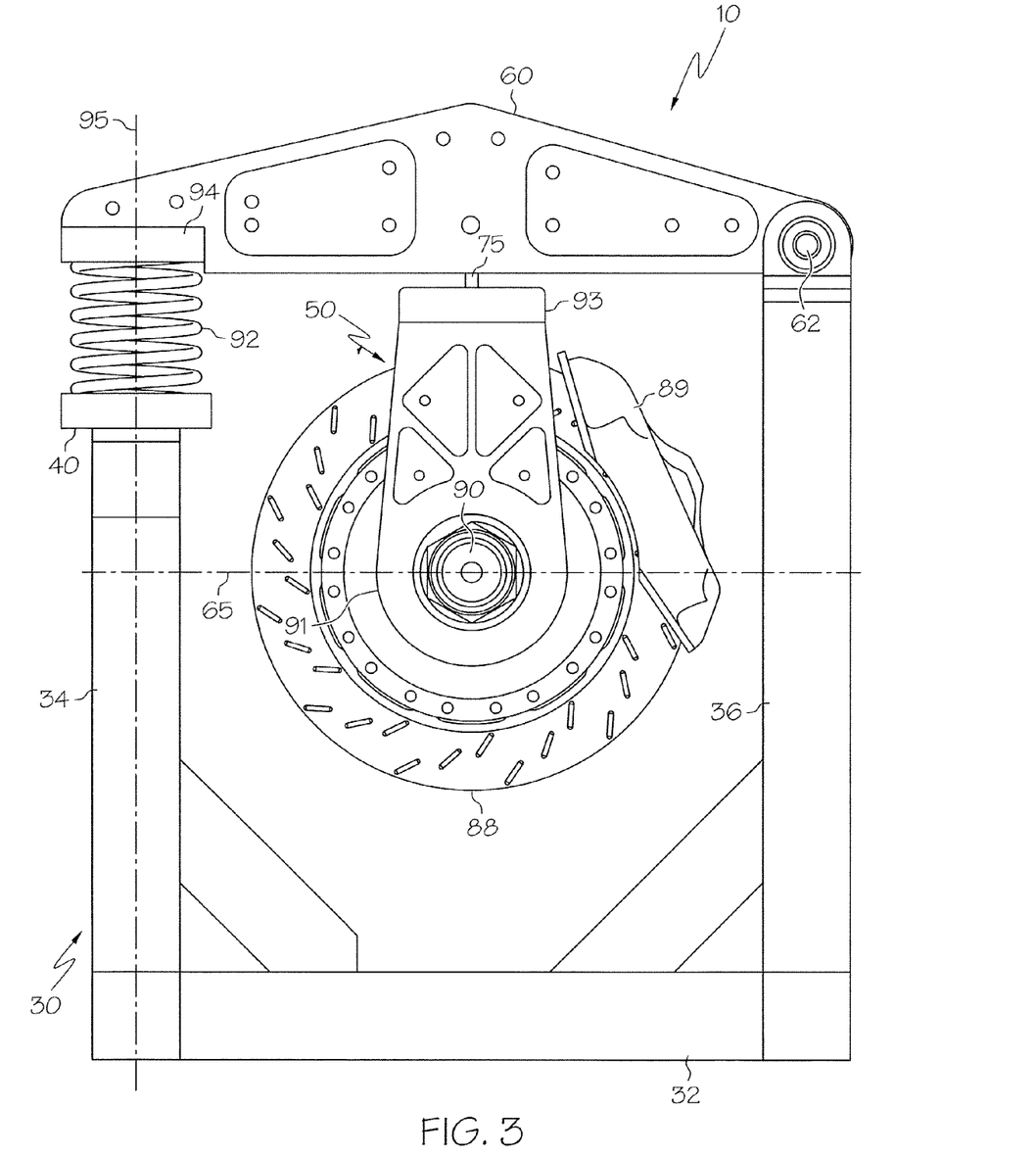
FIG. 3 is a front view of the exemplary spring stand assembly of FIG. 1.
Figure 4:
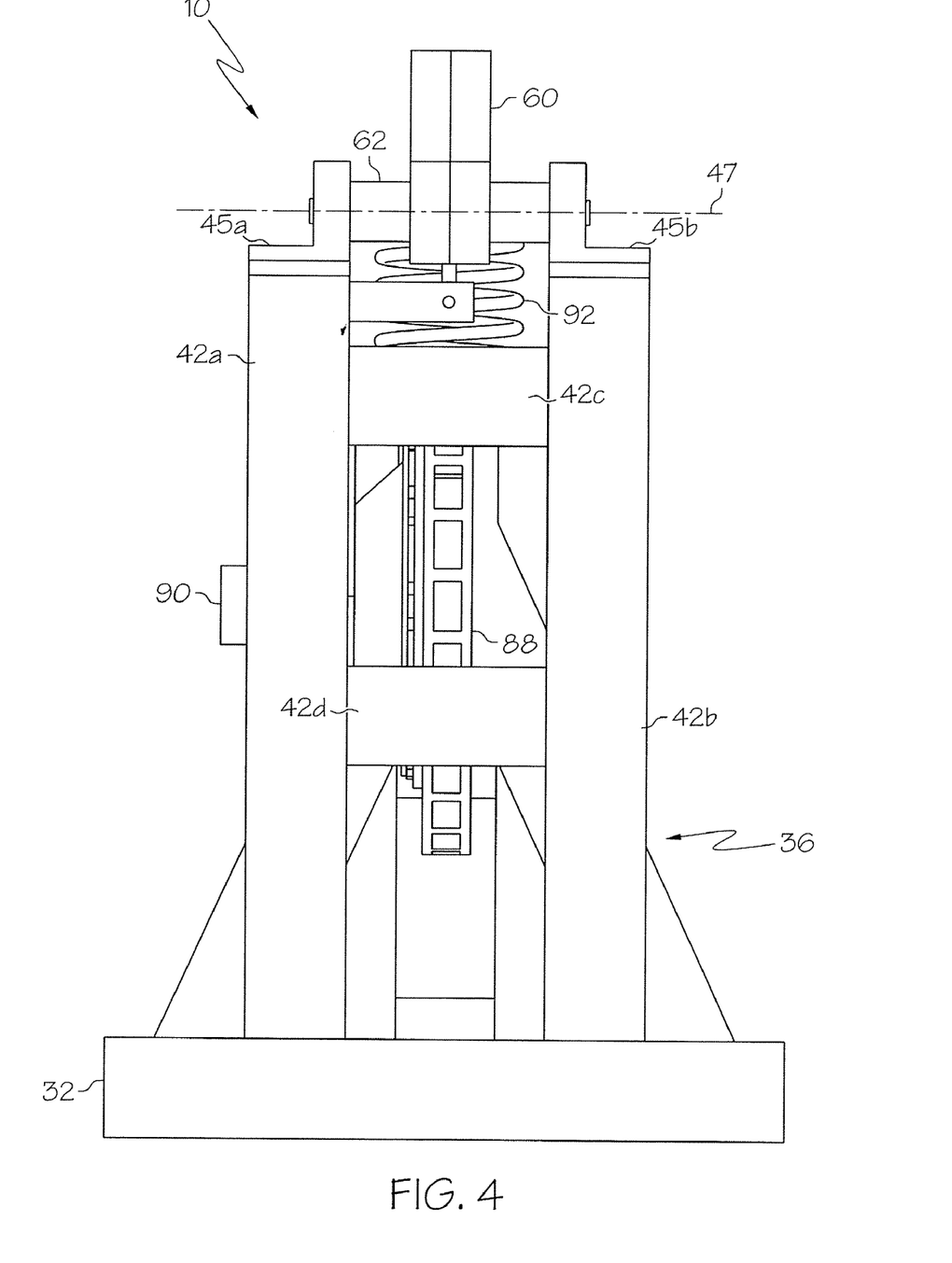
FIG. 4 is another side view of the exemplary spring stand assembly of FIG. 1.

FIGS. 1-4 illustrate an exemplary spring stand assembly 10 in accordance with the present teachings. Spring stand assembly 10 is supported by the top surface of a ram actuator or wheel pan 35. During a testing procedure, wheel pan 35 is configured to move spring stand assembly 10 vertically upward or downward in a manner that simulates the surface of a road, and particularly the various contours typically found within a road's surface. Spring stand assembly 10 comprises frame 30 having a base 32 and first and second arm members 34, 36, which are spaced apart from one another in a parallel fashion by a distance defined by the width of the base 32. First arm member 34 comprises a series of support arms 34a, 34b and 34c, which couple to base 32, as well as spring platform 40. Second arm member 36, as best shown in FIG. 4, also comprises a series of support arms 42a, 42b, 42c and 42d. Support arms 42a and 42b are vertically arranged and couple to base 32 and pivot posts 45a, 45b at opposing ends. Support arms 42c and 42d horizontally intersect support arms 42a and 42b and provide further stability to stand frame 30 during its operation. It should be appreciated that other arm member and/or support member arrangements can be employed by those skilled in the art without departing from the teachings of the present invention. As such, the present teachings are not intended to be limiting herein.

Figure 1:
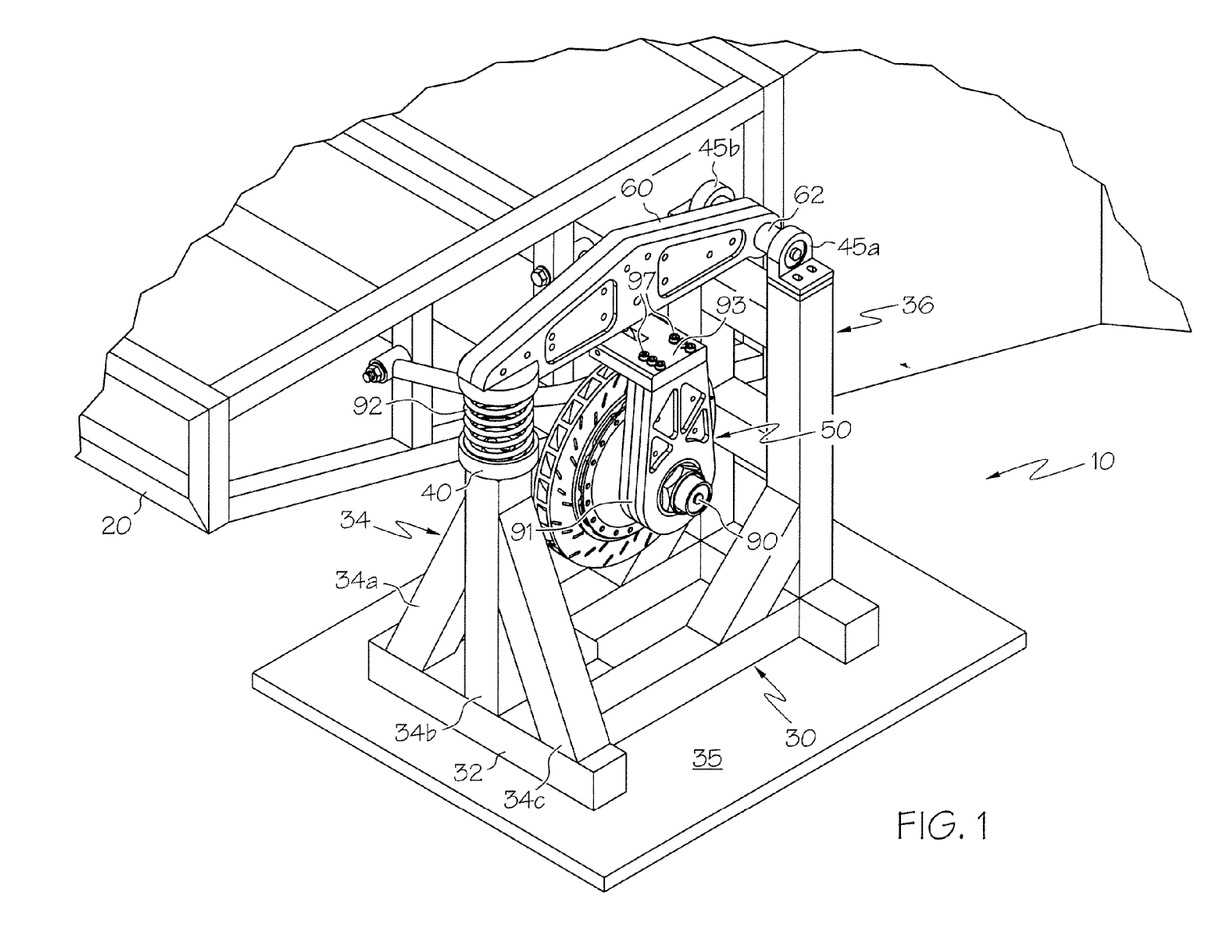
FIG. 1 is a perspective view of an exemplary spring stand assembly in accordance with the present teachings.

During operation (i.e., when a vehicle is being dynamically analyzed as described herein), spring stand assembly 10 is attached to the frame of a vehicle, such as vehicle frame 20 in FIG. 1 for instance. In one exemplary embodiment, spring stand assembly 10 is attached to vehicle frame 20 by affixing a wheel hanger (vehicle hub device) 50 to the chassis suspension hub of a vehicle by means of a tapered nut or nuts. Such nuts are known within the art and are typically used to clamp wheels to vehicles.

Spring stand assembly 10 further comprises a pivot arm member 60, which is pivotably attached to frame 30 via pivot posts 45a and 45b and pivot pin 62, which together form a pivot member. As will be described in detail herein, the pivot arm member 60 can be moved between a use position and an open position. When in the use position (or operating position), as illustrated in FIGS. 1-4, pivot arm member 60 is positioned substantially parallel to the transverse axis 65 (see FIG. 3) of spring stand assembly 10. When in the open position, illustrated by exemplary spring stand assembly 100 in FIG. 5, pivot arm member 60 is configured to extend upwardly or away from the spring platform 40, such that the pivot arm member is no longer substantially parallel to the transverse axis 65 (as shown in FIG. 3). To assist this pivotal motion, pivot pin 62 extends through pivot posts 45a and 45b, such that pivot arm member 60 can be pivoted along pivot axis 47, as shown in FIGS. 2 and 4.

FIG. 3 depicts a front view of an exemplary spring stand assembly adapted to be used for vehicles having a single large nut 90 for affixing wheels to the vehicle. According to this exemplary embodiment, it should be understood and appreciated herein that disc brake rotor 88 and brake caliper 89 are standard parts of a vehicle and are shown here to depict the position of spring stand assembly 10 relative to the vehicle. Vehicle hub device 50 is flexibly suspended from pivot arm member 60 so that the vehicle can move vertically or bounce relative to frame 30 by compression of biasing device 92, which acts through pivot arm member 60.

As mentioned above, pivot arm member 60 is adapted to move between a use position and an open position. To advance and/or compress the pivot arm member 60 between these positions, biasing device 92 is utilized. In one exemplary embodiment, biasing device 92 is a compression spring. According to this embodiment, biasing device 92 is confined between spring platform 40 and pivot arm platform 94 and is adapted to exert a force on pivot arm member 60, such that pivot arm member 60 may be urged away from spring platform 40 along substantially vertical axis 95, as shown in FIG. 3. It should be understood that when the actuators of the test rig are stationary, the vehicle hangs quietly from the four spring stand assemblies and the static weight of the vehicle is balanced by proportional compression of each spring. When the actuators move vertically in simulation of actual road perturbations or according to test cycles described above, biasing device 92 compresses according to the inertial loads caused by the acceleration of the vehicle up and down, in relative motion. This relative motion is very similar to the relative compression of equivalent tires, as in a conventional dynamic rig test. Unlike conventional test rigs, however, vertical damping is lower with the present spring stand assemblies, particularly as the tires are not rotating. Nevertheless, the damping found with the present spring stand assemblies is very similar to that of rotating tires. As such, the function of the spring stands is more consistent than that of non-rotating tires, and changes less with temperature and use. Therefore, the results of the dynamic test are both more realistic and more repeatable than is the case when static tires are used.

Although the illustrated embodiments described herein utilize a compression spring arrangement as the biasing device, it should be understood that any other such biasing device could also be employed herein without straying from the scope of the present teachings. More particularly, any compliance device able to provide the flexible restoring function of biasing device 92 may be used. In certain exemplary embodiments, the rate of biasing device 92 is selected to provide a net spring rate (including the motion ratio of pivot arm member 60) that is identical to the vertical spring rate of the tire that is replaced by the spring stand assembly.

Spring platform 40 and pivot arm platform 94 each include a cylindrical inner portion (not shown) which is adapted to house and locate the compression spring 92. The weight of pivot arm member 60, the other moving parts of the spring stand assembly and the portion of the vehicle itself that is suspended by the stands, each contribute to holding the compression spring 92 in place. The cylindrical parts of platforms 40 and 94 reliably locate compression spring 92, especially such that its distance from pivot arm member 60 remains the same, and thus the effective motion ratio remains the same. When the vehicle is supported by other means (such as blocks under the chassis for instance), the hanging weight is removed, and the pivot arm member or pivot beam can be raised to change the springs to represent a different tire spring rate.

To attach spring stand assembly 10 to vehicle frame 20, hub device 50 is coupled to pivot arm member 60 by way of a bearing shaft 75 (see FIG. 3). As should be understood herein, the connection of hub device 50 to pivot arm member 60 can be accomplished by any connection means known within the art such as, but not limited to, bolting, press fitting, welding, or the like. Hub device 50 includes one or more mounting plates 91 coupled to top horizontal plate 93 by a series of bolts 97. To attach spring stand assembly 10 to vehicle frame 20, hub device 50 is clamped or connected to the vehicle hub by attachment means 90, such as with standard wheel nut(s). Unlike conventional dynamic testing arrangements, which require a vehicle's wheels and tires to be utilized, the present exemplary spring stand assemblies substitute the hub device for the wheel/tire assembly.

Mounting plate(s) 91 are fixed to hub device 50, for instance by weldments, to form a clevis for a spherical joint between adjustable bearing shaft or turnbuckle 75 and hub device 50, such that a bolt aligned horizontally and orthogonally to support mounting plates 91 can secure the attachment of bearing shaft 75 to hub device 50. It should be appreciated and understood herein that such attachment may be flexible in all degrees of motion except to the vertical. As such, vertical compliance of the spring stand assembly is restricted, except for movement allowed by biasing device 92.

In one exemplary embodiment, hub device 50 is flexibly attached or coupled to pivot arm member 60 by way of a spherical joint associated with bearing shaft 75 and affixed by a horizontal bolt (not shown) that is parallel to pivot axis 47 about which pivot arm member 60 pivots. According to this embodiment, a depression is cut into the lower surface of pivot arm member 60. Through this arrangement, it should be understood that a vehicle undergoing dynamic testing may be flexibly suspended from four spring stand assemblies which are attached to the car frame. As such, the two flexible spherical joints between pivot arm member 60 and hub device 50 allow accommodation of wheel geometries such as camber change, wheelbase change, toe change and track change as the suspensions move vertically through their travel.

Figure 5:
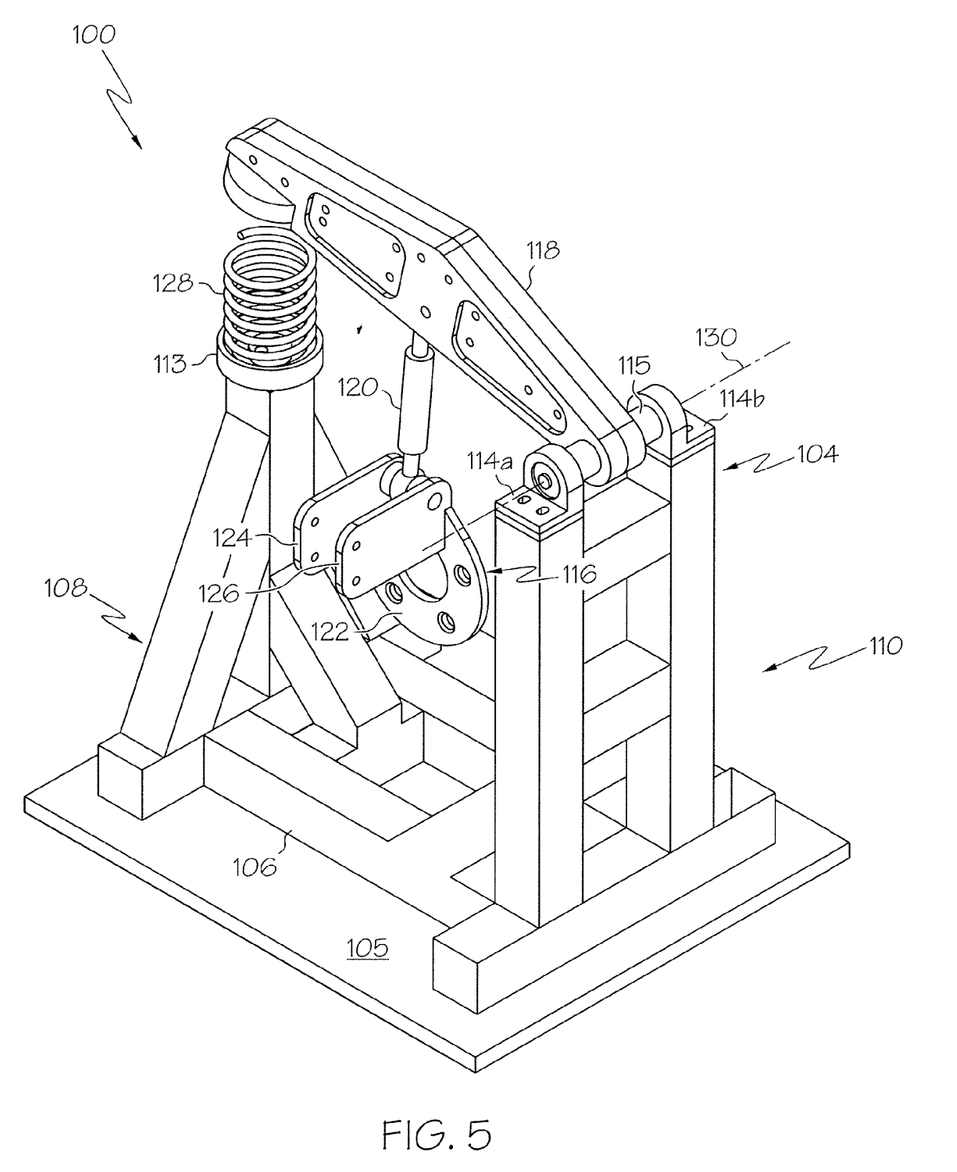
FIG. 5 is a perspective view of an alternative exemplary spring stand assembly depicting a pivot arm in an open configuration in accordance with the present invention.
Figure 6:
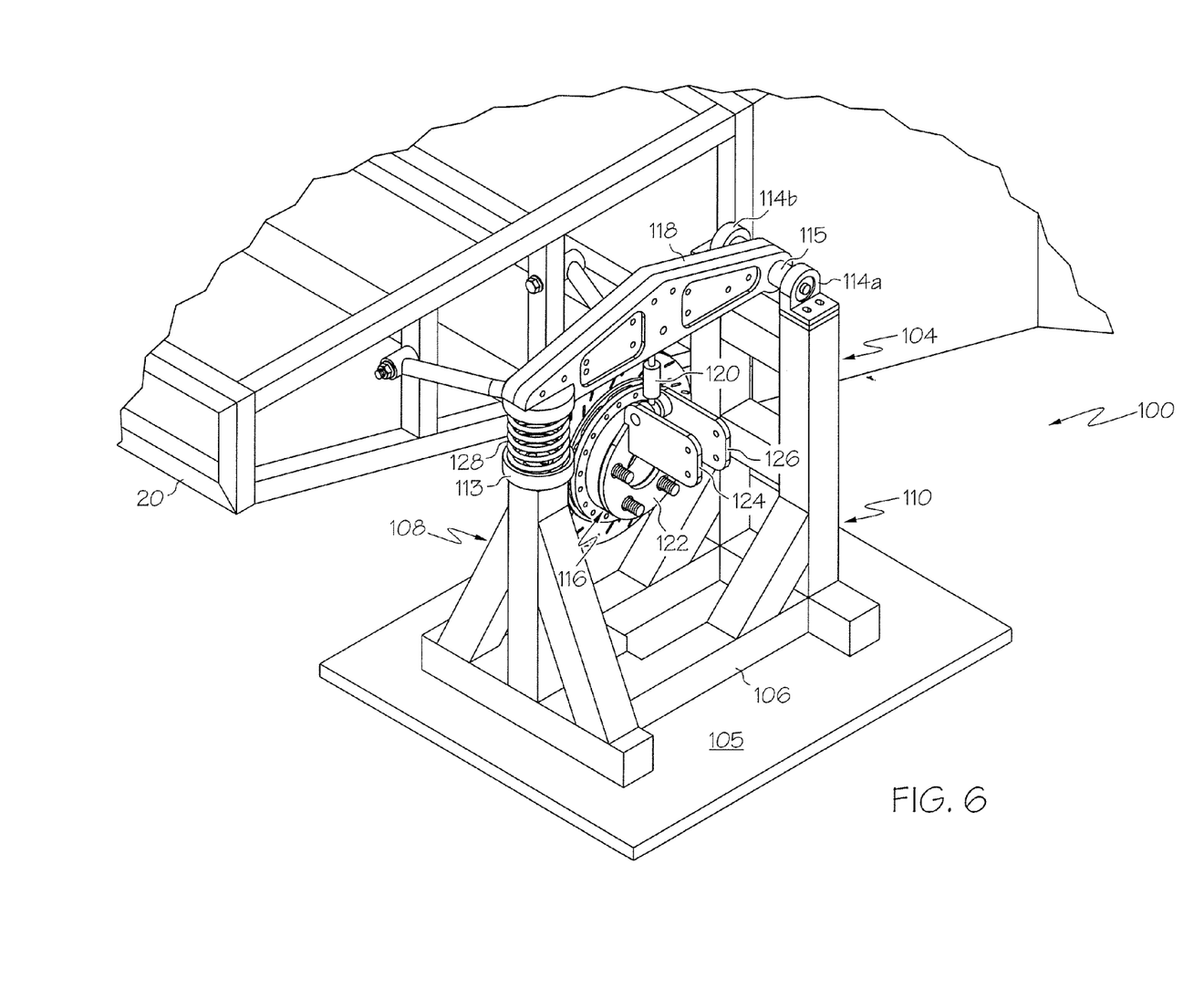
FIG. 6 is another perspective view of the exemplary spring stand assembly of FIG. 5 shown in a use configuration and attached to a vehicle frame in accordance with the present invention.
Figure 7:
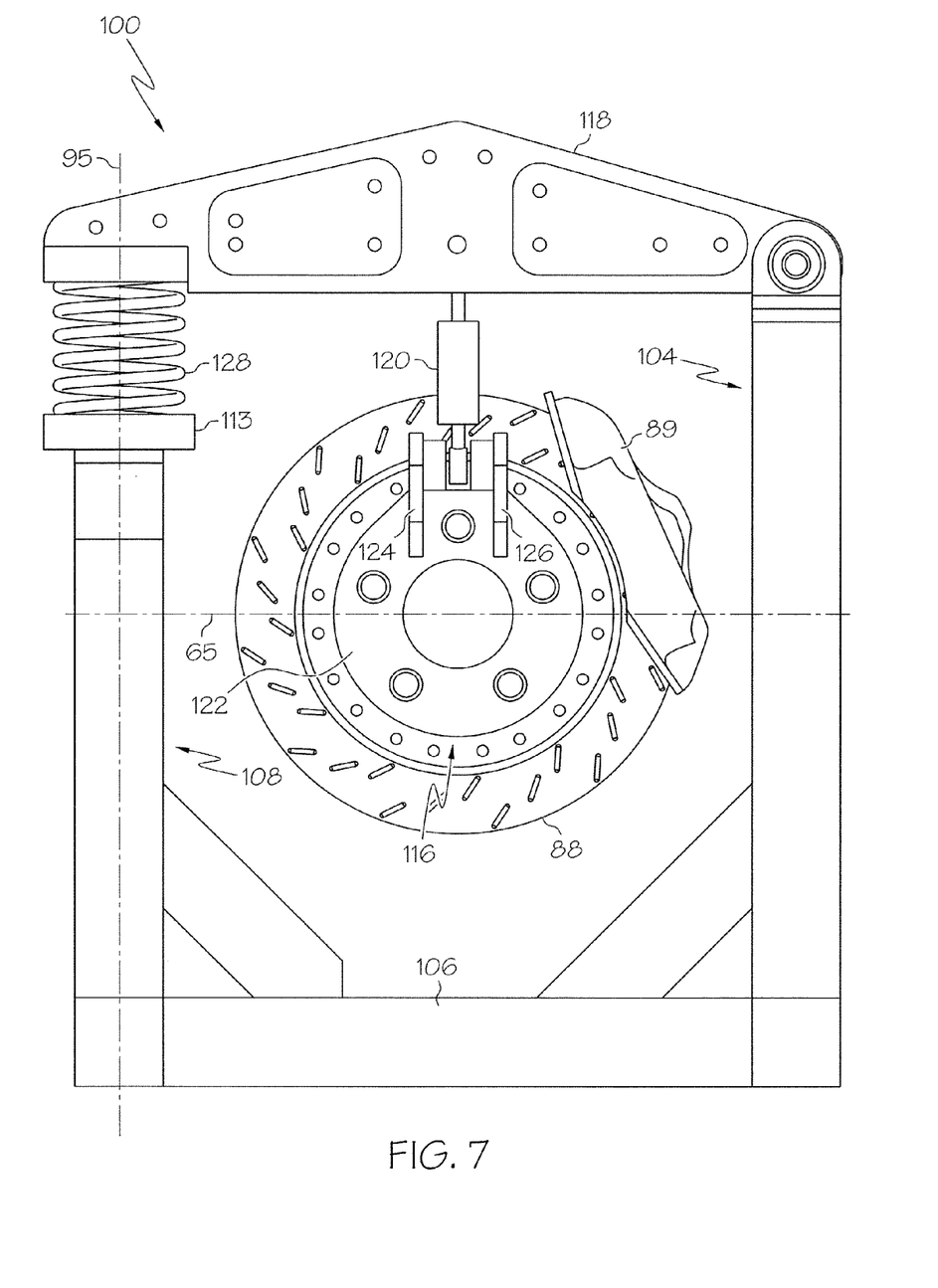
FIG. 7 is a front view of the exemplary spring stand assembly of FIG. 5 shown in a use configuration in accordance with the present invention.

FIGS. 5-7 illustrate an alternative exemplary spring stand assembly adapted for use with a passenger vehicle or other such vehicle having a multiple lug/nut arrangement. Spring stand assembly 100 is supported by the top surface of ram actuator or wheel pan 105 and comprises frame 104, which has a base 106 and first and second arm members 108, 110. First arm member 108 comprises a series of support arms and couples to base 106, as well as spring platform 113. Second arm member 110 also comprises a series of support arms and couples to base 106, as well as pivot posts 114a, 114b, through the assistance of pivot pin 115.

To attach spring stand assembly 100 to vehicle frame 20, hub device 116 is coupled to pivot arm member 118 by way of a bearing shaft 120. Hub device 116 includes mounting plate 122 and two support brackets 124, 126, which are positioned parallel to one another. To attach spring stand assembly 100 to a vehicle frame, hub device 116 is clamped or connected to the vehicle hub by an attachment means, such as with standard wheel nut(s).

Support brackets or plates 124, 126 are fixably attached to hub device 116 by weldments and form a clevis for a spherical joint between adjustable bearing shaft or turnbuckle 120 and hub device 116, such that a bolt aligned horizontally and orthogonally to support brackets 124, 126 can secure the attachment of bearing shaft 120 to hub device 116. It should be appreciated and understood herein that such attachment may be flexible in all degrees of motion except to the vertical. As such, vertical compliance of the spring stand assembly is restricted, except for the movement allowed by biasing device 128.

In one exemplary embodiment, hub device 116 is flexibly attached or coupled to pivot arm member 118 by way of a spherical joint associated with bearing shaft 120 and affixed by a horizontal bolt (not shown) that is parallel to pivot axis 130 about which pivot arm member 118 pivots. According to this embodiment, a depression is cut into the lower surface of pivot arm member 118. Through this arrangement, it should be understood that a vehicle undergoing dynamic testing may be flexibly suspended from four spring stand assemblies which are attached to the car frame. As such, the two flexible spherical joints between pivot arm member 118 and hub device 116 allow accommodation of wheel geometries such as camber change, wheelbase change, toe change and track change as the suspensions move vertically through their travel.

Once the spring stand assembly (10 or 110) is coupled or attached to a vehicle frame, a computer system can be implemented to conduct the dynamic vehicle analysis procedure. Such computer systems are known within the field of dynamic vehicle testing. Exemplary computer systems useful in conjunction with the present teachings comprise at least one user interface and utilize computer programming logic (or other such software-based program(s)) to operate the actuators connected to the vehicle frame. To activate such actuators, the computer system may have conventional input devices, such as a keyboard, and a mouse, a conventional electronic display screen (such as a monitor, LCD screen, or other suitable display), and optionally a conventional hard copy output device (e.g., a laser printer). Those skilled in the art will appreciate that other suitable input devices may also be utilized according to this embodiment without straying from the present teachings.

According to one exemplary embodiment, the computer system inputs energy to the vehicle frame to cause it to move by activating one or more actuator rams attached to the vehicle frame (not shown). In one exemplary embodiment, the one or more actuator rams can move the vehicle frame with a predetermined force. According to this embodiment, the actuator rams move the vehicle frame through a predetermined displacement over a period-of-time, which can then be graphed as displacement vs. time in speed. While this illustrated embodiment discloses the input of a predetermined energy to the vehicle frame, it should also be understood and appreciated herein that the computer system may also be operated randomly, such that the rams are actuating with randomized forces to be analyzed by the computer system.

In another exemplary embodiment, the computer system inputs energy to the vehicle frame by a transfer function evaluation of data generated from the "Heave Mode Constant Peak Velocity Sine Sweep" excitation process. According to this exemplary embodiment, all four wheel pans of the vehicle are driven, in phase, with a common signal. The signal comprises a sine wave signal having an amplitude that, when differentiated, produces a constant peak vertical velocity of each wheel pan, for example 2 inches per second, as the sine wave frequency varies from, for instance, 1 Hertz to 20 Hertz. Such an excitation wave has an amplitude that decreases as the inverse of frequency. A typical transfer function will relate wheel pan load to wheel pan displacement or velocity. Peak amplitudes occur at vehicle heave and pitch modes, which thereby give valuable information to optimize chassis springs and dampers. In alternative embodiments, simulated road profile data can be used to drive the wheel pans individually.

According to this exemplary embodiment, standard statistical means known within the art can be used to evaluate wheel pan load variations.

In certain exemplary embodiments in response to computer-generated signals, actuators move the spring stand assemblies up and down to precisely replicate desired, predefined vertical displacement-versus-time patterns. Software and mechanisms, typically proprietary to the test rig manufacturer or the laboratory that conducts the tests, ensure by efficient closed-loop control that the desired motions are achieved regardless of load variations. Actuators (typically three) attached to the vehicle chassis (or body) operate somewhat differently. Typically, they do not enforce displacement or position over time, since it is the vehicle response, not the actuator response, that is of interest. Rather, then, these actuators generate precise forces, not displacements, and otherwise follow the motion of the vehicle. The vehicle suspension and tire vertical motion only permit relative vertical motion of the vehicle. The parameters examined, and the criteria for good performance, vary according to the goals of the test. If a smooth ride for passengers is the goal, then typically, vertical motion of the chassis is evaluated through analysis of the displacements of the chassis-mounted ram actuators. If maximum traction over rough roads or race tracks is the goal, then typically the variation of vertical loads transmitted by the spring stands are measured by load cells in the ram actuator top surfaces that represent the load, and are then evaluated as described above. The spring stand parts move as described above, and the motion is completely accounted for by compression and extension of the spring, although typically at a different motion ratio from the vehicle suspension to the ram actuator "ground". Thus, the spring stand simply replaces the non-rolling tire in nearly all aspects, but does so with more realistic damping than real tires, and with better consistency and repeatability.

While exemplary embodiments incorporating the principles of the present teachings have been disclosed hereinabove, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain and which fall within the limits of the appended claims.

What is claimed is:

1. An apparatus for testing a vehicle, comprising:
   an actuator configured to move the vehicle in response to a comutper-generated signal;
   a biasing member configured to extend and compress along a vertical axis in response to the movement of the vehicle by the actuator; and
   a stand assembly supported by the actuator, the stand assembly including a coupling device configured to attach to the vehicle.

2. The apparatus of claim 1, wherein the stand assembly further comprises a pivot arm configured to move from a first position to a second position relative to a pivot axis of the stand assembly.

3. The apparatus of claim 2, wherein the pivot arm is substantially parallel to a transverse axis of the stand assembly when located at the first position.

4. The apparatus of claim 2, wherein the biasing member is releasably coupled to the pivot arm and configured to support the pivot arm when located at the first position.

5. The apparatus of claim 2, wherein the coupling device is suspended from the pivot arm and configured to allow movement of the vehicle.

6. The apparatus of claim 5, wherein the stand assembly further comprises a spherical joint coupled to the pivot arm and the coupling device, the spherical joint to provide for a wheel geometry as the vehicle is moved.

7. The apparatus of claim 6, wherein the wheel geometry includes at least one of a camber change, a wheelbase change, a toe change and a track change.

8. The apparatus of claim 2, wherein the coupling device includes an attachment device, the attachment device being attachable to a hub of the vehicle.

9. The apparatus of claim 8, wherein the attachment device comprises a bolt.

10. The apparatus of claim 1, wherein the coupling device includes at least one mounting plate fixably attached thereto and configured to form a clevis for a spherical joint between a bearing shaft and the coupling device.

11. The apparatus of claim 10, further comprising a bolt aligned horizontally and orthogonally to the at least one mounting plate, the bolt being configured to secure the bearing shaft to the coupling device in a manner such that the stand assembly is flexible in all degrees of motion except the vertical.

12. The apparatus of claim 1, wherein the biasing member comprises a spring.

13. The apparatus of claim 1, wherein the actuator comprises a ram actuator.

14. An apparatus for testing a vehicle, comprising:
   a base;
   a pivot arm pivotably coupled to the base and configured to move from a first position to a second position relative to a pivot axis of the base, the pivot arm being substantially parallel to a transverse axis of the base when in the first position;
   a biasing member releasably coupled to the pivot arm, the biasing member being configured to support the pivot arm when in the first position and to extend and compress along a vertical axis in response to movement of the vehicle; and
   a coupling device configured to attach to a vehicle, the coupling device being suspended from the pivot arm and configured to allow the movement of the vehicle.

15. The apparatus of claim 14, wherein the base further comprises a spherical joint coupled to the pivot arm and the coupling device, the spherical joint to provide for a wheel geometry as the vehicle is moved.

16. The apparatus of claim 15, wherein the wheel geometry includes at least one of a camber change, a wheelbase change, a toe change and a track change.

17. The apparatus of claim 14, wherein the coupling device includes an attachment device, the attachment device being attachable to a hub of the vehicle.

18. The apparatus of claim 17, wherein the attachment device comprises a bolt.

19. The apparatus of claim 14, wherein the coupling device includes at least one mounting plate fixably attached thereto and configured to form a clevis for a spherical joint between a bearing shaft and the coupling device.

20. The apparatus of claim 14, wherein the biasing member comprises a spring.

21. An apparatus for testing a vehicle, comprising:
   an actuator configured to move the vehicle in response to a computer-generated signal;

a stand assembly supported by the actuator, the stand assembly comprising a coupling device configured to attach to the vehicle;

a biasing member configured to extend and compress along a vertical axis in response to the movement of the vehicle by the actuator; and a controller coupled to the actuator, the controller including an output and being configured to generate the computer-generated signal to the actuator to cause the vehicle to move in response thereto.

22. The apparatus of claim 21, wherein the stand assembly further comprises a pivot arm configured to move from a first position to a second position relative to a pivot axis of the stand assembly.

23. The apparatus of claim 22, wherein the pivot arm is substantially parallel to a transverse axis of the stand assembly when located at the first position.

24. The apparatus of claim 22, wherein the biasing member is releasably coupled to the pivot arm and configured to support the pivot arm when located at the first position.

25. The apparatus of claim 24, wherein the coupling device is suspended from the pivot arm and configured to allow movement of the vehicle.

26. The apparatus of claim 25, wherein the stand assembly further comprises a spherical joint coupled to the pivot arm and the coupling device, the spherical joint to provide for a wheel geometry as the vehicle is moved.

27. The apparatus of claim 26, wherein the wheel geometry includes at least one of a camber change, a wheelbase change, a toe change and a track change.

28. The apparatus of claim 21, wherein the coupling device includes an attachment device, the attachment device being attachable to a hub of the vehicle.

29. The apparatus of claim 28, wherein the attachment device comprises a bolt.

30. The apparatus of claim 21, wherein the coupling device includes at least one mounting plate fixably attached thereto and configured to form a clevis for a spherical joint between a bearing shaft and the coupling device.

31. The apparatus of claim 30, farther comprising a bolt aligned horizontally and orthogonally to the at least one mounting plate, the bolt being configured to secure the bearing shaft to the coupling device in a manner such that the stand assembly is flexible in all degrees of motion except the vertical.

32. The apparatus of claim 21, wherein the actuator is configured to move the vehicle through a displacement pattern in response to the signal from the controller.

33. The apparatus of claim 21, wherein the signal comprises a sine wave signal that produces a constant peak vertical velocity to the actuator.

34. The apparatus of claim 33, wherein the constant peak vertical velocity is about 2 inches per second as the sine wave varies from about 1 Hertz to about 20 Hertz.

35. A method for testing a vehicle, the method comprising the steps of:

providing a vehicle testing apparatus comprising an actuator configured to move the vehicle, a biasing member configured to extend and compress along a vertical axis ins response to the movement of the vehicle and a stand assembly supported by the actuator and including a coupling device configured to attached to the vehicle;

generating a signal to the actuator to cause the vehicle to move through a displacement pattern; and evaluating the movement of the vehicle by analyzing the displacement of the actuator.

36. The method of claim 35, wherein the step of generating a signal to the actuator comprises causing a computer to produce a sine wave signal to move the actuator, the sine wave including an amplitude being configured to produce a constant peak vertical velocity.

37. The method of claim 36, wherein the step of moving the vehicle comprises causing the signal to force the actuator to move the stand assembly up and down in a manner that replicates the displacement pattern.

38. The method of claim 36, wherein the constant peak vertical velocity is about 2 inches per second as the sine wave varies from about 1 Hertz to about 20 Hertz.

39. The method of claim 37, wherein the step of analyzing the displacement of the actuator comprises measuring vertical load variations transmitted by the stand assembly to the vehicle in response to the actuator's movement.

40. The method of claim 39, wherein the step of measuring vertical load variations comprises measuring load cells in the actuator.

41. An apparatus for testing a vehicle, comprising:

an actuator configured to move the vehicle in response to a computer-generated signal;

a stand assembly supported by the actuator, the stand assembly including a coupling device configured to attach to the vehicle and a pivot arm configured to move from a first position to a second position relative to a pivot axis of the stand assembly; and a spring releasably coupled to the pivot arm and configured to support the pivot arm when located at the first position.

42. An apparatus for testing a vehicle, comprising:

a base;

a pivot arm pivotably coupled to the base and configured to move from a first position to a second position relative to a pivot axis of the base, the pivot arm being substantially parallel to a transverse axis of the base when in the first position;

a spring releasably coupled to the pivot arm and configured to support the pivot arm when in the first position; and a coupling device configured to attach to a vehicle, the coupling device being suspended from the pivot arm and configured to allow movement of the vehicle.

43. An apparatus for testing a vehicle, comprising:

an actuator;

a stand assembly supported by the actuator, the stand assembly comprising a coupling device configured to attach to the vehicle; and a controller coupled to the actuator, the controller including an output and being configured to generate a sine wave signal that produces a constant peak vertical velocity to the actuator to cause the vehicle to move in response thereto.

44. The apparatus of claim 43, wherein the constant peak vertical velocity is about 2 inches per second as the sine wave varies from about 1 Hertz to about 20 Hertz.

45. A method for testing a vehicle, the method comprising the steps of: providing an actuator, the actuator configured to support a stand assembly attached to the vehicle;

causing a computer to generate a sine wave signal to the actuator to cause the vehicle to move through a displacement pattern, the sine wave signal including an amplitude configured to produce a constant peak vertical velocity; and evaluating the movement of the vehicle by analyzing the displacement of the actuator.

46. The method of claim 45, wherein the step of generating a signal to the actuator comprises causing a computer to produce a sine wave signal to move the actuator, the sine wave including an amplitude being configured to produce a constant peak vertical velocity.

47. The method of claim 46, wherein the step of moving the vehicle comprises causing the signal to force the actuator to move the stand assembly up and down in a manner that replicates the displacement pattern.

48. The method of claim 46, wherein the constant peak vertical velocity is about 2 inches per second as the sine wave varies from about 1 Hertz to about 20 Hertz.

49. The method of claim 47, wherein the step of analyzing the displacement of the actuator comprises measuring vertical load variations transmitted by the stand assembly to the vehicle in response to the actuator's movement.

50. The method of claim 49, wherein the step of measuring vertical load variations comprises measuring load cells in the actuator.

* * * * *

UNITED STATES PATENT AND TRADEMARK OFFICE
CERTIFICATE OF CORRECTION

PATENT NO. : 7,461,556 B2  
APPLICATION NO. : 11/555735  
DATED : December 9, 2008  
INVENTOR(S) : James Hamilton Page 1 of 1

It is certified that error appears in the above-identified patent and that said Letters Patent is hereby corrected as shown below:

Column 7, line 50, replace the term "comutper-generated" with the term "computer-generated"

Column 9, line 41, replace the term "farther" with the term "further"

Column 9, line 61, replace the term "ins" with the term "in"

Column 9, line 63, replace the term "attached" with the term "attach"

Signed and Sealed this

Twenty-fourth Day of February, 2009

JOHN DOLL  
*Acting Director of the United States Patent and Trademark Office*